(12) United States Patent
Ha et al.

(10) Patent No.: US 8,610,065 B2
(45) Date of Patent: Dec. 17, 2013

(54) READOUT INTEGRATED CIRCUIT FOR INFRARED SIGNAL AND METHOD OF READING OUT INFRARED SIGNAL

(75) Inventors: Dong Heon Ha, Gyeonggi-do (KR); Sang Ho Lee, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 222 days.

(21) Appl. No.: 13/294,275

(22) Filed: Nov. 11, 2011

(65) Prior Publication Data

US 2012/0119090 A1    May 17, 2012

(30) Foreign Application Priority Data

Nov. 12, 2010 (KR) .................. 10-2010-0112780

(51) Int. Cl.
*G01J 5/00* (2006.01)
(52) U.S. Cl.
USPC ........................................... 250/338.1

(58) Field of Classification Search
USPC ........................................... 250/338.1
See application file for complete search history.

(56) References Cited

U.S. PATENT DOCUMENTS

| | | |
|---|---|---|
| 2009/0095909 A1 | 4/2009 | Funaki |
| 2009/0152465 A1 | 6/2009 | Dupont |
| 2010/0128157 A1* | 5/2010 | Panicacci ..................... 348/308 |

FOREIGN PATENT DOCUMENTS

| | | |
|---|---|---|
| JP | 2008-082789 A | 4/2008 |
| KR | 10-900770 B1 | 5/2009 |

* cited by examiner

*Primary Examiner* — David Porta
*Assistant Examiner* — Hugh H Maupin
(74) *Attorney, Agent, or Firm* — William Park & Associates Patent Ltd.

(57) ABSTRACT

There is provided a readout integrated circuit for an infrared signal that is able to operate at low power and reduce a pixel pitch without the use of a skimming capacitor.

11 Claims, 5 Drawing Sheets

(OPERATION MODE)

FIG. 1
(OPERATION MODE)

FIG. 5

READOUT INTEGRATED CIRCUIT FOR INFRARED SIGNAL AND METHOD OF READING OUT INFRARED SIGNAL

CROSS-REFERENCE TO RELATED APPLICATIONS

This application claims priority to Korean Patent Application No. 10-2010-0112780 filed on Nov. 12, 2010, in the Korean Intellectual Property Office, and which is incorporated herein by reference in its entirety.

BACKGROUND OF THE INVENTION

1. Field of the Invention

Various embodiments of the present invention relate to an infrared image sensor, and more particularly, to a readout integrated circuit (ROIC) for an infrared signal applicable to an uncooled infrared image sensor such as a microbolometer.

2. Description of the Related Art

An infrared thermal imaging system is an apparatus able to obtain an image of an object using emitted radiant energy, and has a wide range of military, industrial, medical, and other applications.

An infrared thermal imaging system may include, for example, an optical system, an infrared detector, a readout integrated circuit (ROIC), a signal processing circuit and the like. In developing an infrared thermal imaging system, a material for the infrared detector, a micro-machining process, a design of the readout integrated circuit for processing an electrical signal output from the infrared detector, a monolithic process for connecting the infrared detector to the readout integrated circuit, a packaging process and the like are all essential elements.

In particular, in order to develop a high-resolution readout integrated circuit (ROIC) for an infrared signal, a technique for designing a high-integrated yet low-power circuit, satisfying the factors of the characteristics of the detector, a signal operation range, a detection rate, noise characteristics, the size of cells, power consumption and the like, is essential.

For example, a readout integrated circuit for an uncooled infrared image sensor such as a microbolometer may include a circuit for performing current skimming within a pixel for a lower power operation.

SUMMARY OF THE INVENTION

An aspect of the present invention provides a readout integrated circuit for an infrared signal capable of operating at low power and reducing a pixel pitch.

According to an aspect of the present invention, there is provided a readout integrated circuit for an infrared signal including a skimming transistor configured to allow a background current to flow through a microbolometer according to a gate voltage. A plurality of global lines may supply voltages, where each voltage may be of a different level, and a voltage may be supplied to a gate of the skimming transistor. A global line selecting unit may be configured to select a global line to be connected to the skimming transistor to provide a voltage to the gate. A signal detecting unit may be configured to output a digital signal corresponding to a signal current additionally flowing through the microbolometer.

According to another aspect of the present invention, there is provided a method of detecting an infrared signal, the method including storing during a calibration mode first digital data corresponding to voltage corresponding to a background current flowing through a microbolometer. During operation mode, a voltage corresponding to the first digital data may be selected. During operation mode, second digital data may be produced that corresponds to a signal current where the background current and the signal current flow through the microbolometer.

BRIEF DESCRIPTION OF THE DRAWINGS

The above and other aspects, features and other advantages of the present invention will be more clearly understood from the following description taken in conjunction with the accompanying drawings, in which.

DETAILED DESCRIPTION OF THE INVENTION

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

A component described as being "connected to" or "accessing" another component may be directly connected to or accessing the other component. But it is to be understood that another component may exist therebetween. On the other hand, when a component is mentioned as being "directly connected to" or "directly accessing" another component, it is to be understood that there are no other components in between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will now be described with reference to the accompanying drawings. In order to facilitate a further understanding of the invention, the same reference numerals will be used throughout to designate the same or like components in the accompanying drawings, and redundant explanations with respect to the same components will be omitted.

Figure 1:
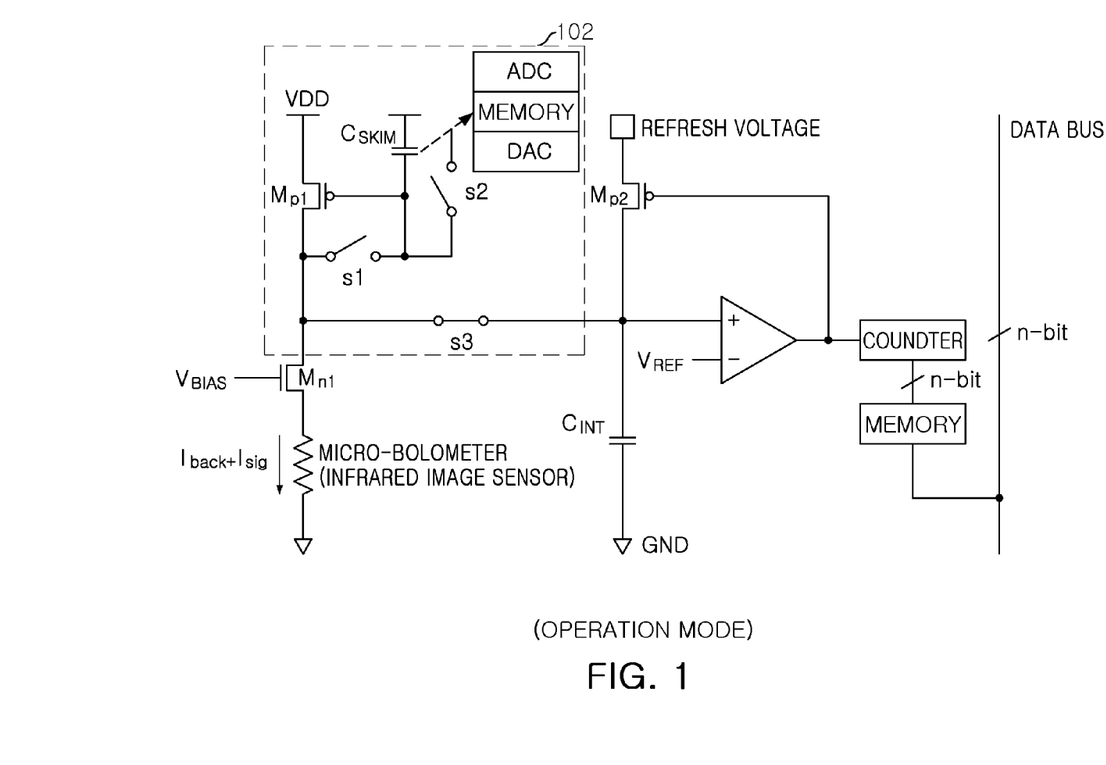
FIG. 1 is a circuit diagram illustrating a readout integrated circuit for an infrared signal including a current skimming circuit.

FIG. 1 illustrates a readout integrated circuit for an infrared signal including a current skimming circuit.

As shown in FIG. 1, a current skimming circuit 102 may include a skimming transistor Mp1, an analog-to-digital converter (ADC), a digital-to-analog converter (DAC), a memory block MEMORY for storing the output of the ADC, a skimming capacitor $C_{SKIM}$, switches s1, s2, and s3, and the like.

A period for reading an image by an uncooled infrared image sensor such as a microbolometer is split into frame times (or integration times). Each frame time is divided into a calibration mode and an operation mode.

In the calibration mode, a microbolometer operates at room temperature of about 300K. Here, the switch s1 is turned on and the switch S3 is turned off such that the skimming transistor Mp1 performs a diode connected operation. A gate of the skimming transistor Mp1 is connected to the skimming capacitor $C_{SKIM}$, such that a gate voltage of the skimming transistor Mp1 is applied to the skimming capacitor $C_{SKIM}$. In this mode, a current flowing through the microbolometer is referred to as $I_{back}$.

The operation mode indicates a case where a temperature of an object to be detected is at a temperature other than about 300K. In the operation mode, the switch s1 is turned off and the voltage stored in the skimming capacitor $C_{SKIM}$ in the calibration mode is applied to the gate of the skimming transistor Mp1. Accordingly, the current $I_{back}$ equal to that in the calibration mode flows through the skimming transistor Mp1.

However, since the temperature of the object viewed is different than the room temperature of about 300K, the current flowing through the microbolometer includes a current $I_{sig}$ corresponding to a temperature change in addition to the current $I_{back}$. Therefore, the total current through the microbolometer may be described generally as $I_{back}+I_{sig}$ where $I_{sig}$ is temperature dependent. That is, since resistivity of the microbolometer changes in proportion to change in the temperature of the object, the current $I_{sig}$ corresponding to the resistivity change is added to the current $I_{back}$ and the summed current flows through the microbolometer.

Since the current through the microbolometer is $I_{back}+I_{sig}$, and the current through the skimming transistor Mp1 is $I_{back}$, the current $I_{sig}$ may flow through the integration capacitor $C_{INT}$. Accordingly, it can be seen that the current skimming circuit 102 in the readout integrated circuit of FIG. 1 enables a lower power operation in the remainder of the readout integrated circuit of FIG. 1.

When current skimming is performed as described above, the readout integrated circuit has a reduction in current consumption for restoring an image read by the uncooled infrared image sensor. However, since the skimming transistor Mp1 operates based on a voltage stored in the skimming capacitor $C_{SKIM}$ in the operation mode, leakage in the skimming capacitor may degrade a degree of current skimming precision.

As operation time increases between calibration mode, current skimming precision is significantly reduced. This may reduce accuracy during operation mode.

In order to solve the above-mentioned problems, a voltage value stored in the skimming capacitor $C_{SKIM}$ is converted into a digital value using the ADC, and the converted digital value is stored in a memory block MEMORY. Thereafter, the converted digital value stored in the memory block MEMORY is converted to an analog value using the DAC for each frame time, and the converted analog value is supplied to the skimming capacitor $C_{SKIM}$. A voltage value stored in the skimming capacitor $C_{SKIM}$ is reapplied to the gate of the skimming transistor of each pixel.

However, leakage in the skimming capacitor $C_{SKIM}$ may vary the applied gate voltage even in a single frame time. In order to minimize such variations, a large skimming capacitor with high capacitance ranging from several pF to several tens of pF may be required.

Figure 2:
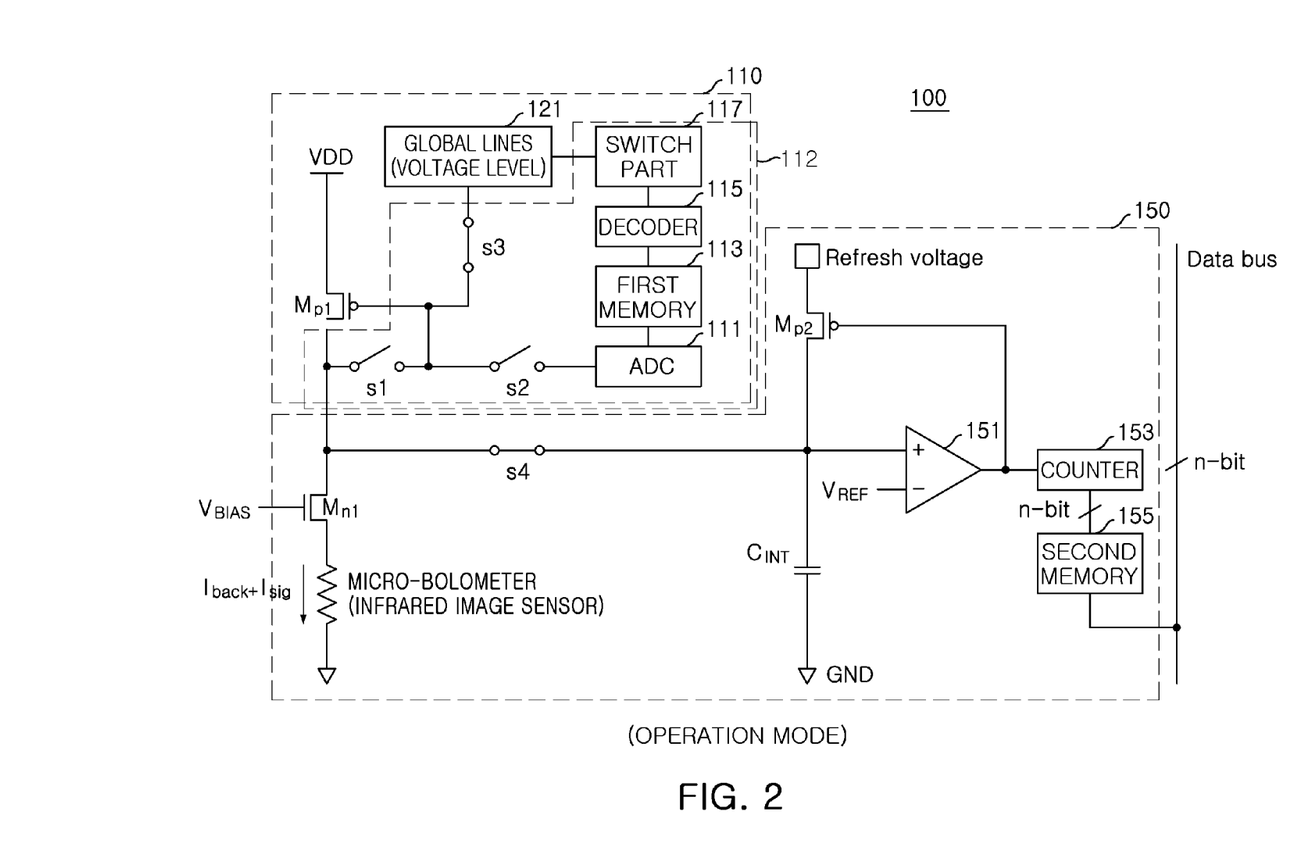
FIG. 2 a circuit diagram illustrating a readout integrated circuit for an infrared signal according to an embodiment of the present invention.
Figure 3:
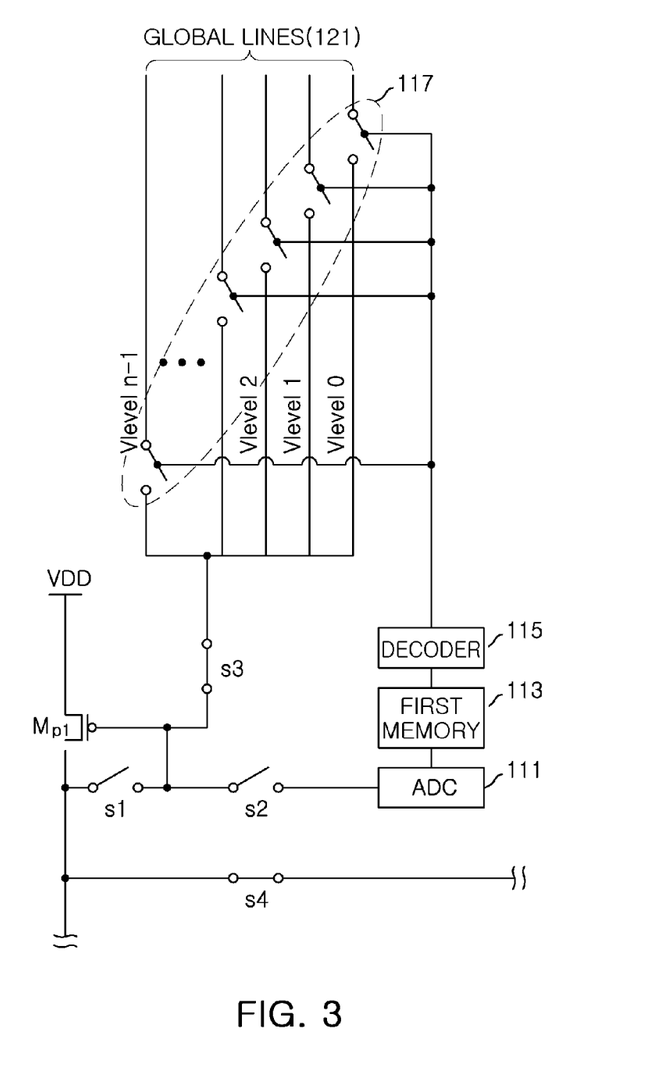
FIG. 3 is a circuit diagram illustrating a detailed configuration of a current skimming unit of FIG. 2.

FIG. 2 is a circuit diagram illustrating a readout integrated circuit for an infrared signal according to an embodiment of the present invention and FIG. 3 is a circuit diagram illustrating a detailed configuration of a current skimming unit of FIG. 2.

With reference to FIGS. 2 and 3, a readout integrated circuit 100 for an infrared signal includes a current skimming unit 110 and a signal detecting unit 150.

The current skimming unit 110 controls current flowing through a microbolometer, so that it may serve to restrict current required for detecting an infrared signal.

Specifically, the current skimming unit 110 may include the skimming transistor Mp1, a plurality of global lines 121, and a global line selecting unit 112. The global line selecting unit 112 may include an analog-to-digital converter 111, a first memory 113, a decoder 115, a switch part 117, and a plurality of switches S1, S2, and S3. Each of the global lines 121 may have a specific voltage applied to it as shown in FIG. 3. Accordingly, by appropriately turning on a switch in the switch part 117, a desired voltage may be applied to the gate of the skimming transistor Mp1. Accordingly, this may allow removal of a skimming capacitor, and its associated real estate in a pixel.

The skimming transistor Mp1 may be a p-type Metal-Oxide Semiconductor Field Effect Transistor (MOSFET), for example. A source of the skimming transistor Mp1 is connected to the analog-to-digital converter 111 by the switches S1 and S2, connected to a comparator 151 by a switch S4, and connected to a drain of a driving transistor Mn1 controlling operation of the microbolometer connected to the driving transistor Mn1.

Also, the skimming transistor Mp1 is turned on or off according to a voltage supplied from the global line 121 to a gate of the skimming transistor Mp1 such that it may control current flowing to the microbolometer. For example, when the skimming transistor Mp1 is turned on according to a voltage supplied through a specific global line among the plurality of global lines 121, a background current $I_{back}$ flows through the skimming transistor Mp1 and is supplied to the microbolometer.

The analog-to-digital converter 111 converts a gate voltage $V_{SKIM}$ of the skimming transistor Mp1 into digital data in a calibration mode of a frame time (or an integration time) and stores the converted digital data in the first memory 113.

The decoder 115 decodes the digital data stored in the first memory 113 and supplies a decoded signal to the switch part 117, such that it may cause a specific switch connected between each global line and the gate of the skimming transistor Mp1 to operate according to the decoded signal.

Accordingly, a specific global line among the plurality of global lines 121 is connected to the gate of the skimming transistor Mp1, such that a predetermined voltage may be applied to the gate of the skimming transistor Mp1 through the corresponding one of the global lines 121.

The switch part 117 may include a plurality of switches corresponding to the plurality of global lines 121. The plurality of switches included in the switch part 117 may be individually turned on or off according to the output of the decoder 115 such that they may allow the respective global lines and the gates of the skimming transistors Mp1 to be connected or disconnected.

The plurality of global lines 121 may be connected to the gate of the skimming transistor Mp1 for every pixel of an infrared image sensor, and each of the global lines 121 may provide voltages having different levels at the outside of a pixel area. Further, each of the global lines 121 provides a predetermined voltage to the gate of the skimming transistor Mp1 when the corresponding switch is turned on. There may be a microbolometer for every pixel in a pixel area.

As shown in FIG. 2, the signal detecting unit 150 may include the driving transistor Mn1, the microbolometer, the switch S4, the integration capacitor ($C_{INT}$), the comparator 151, a counter 153, and a second memory 155.

The signal detecting unit 150 may compare a voltage corresponding to an object being imaged with a predetermined reference voltage. The voltage corresponding to the object being imaged may depend on current flowing through the microbolometer, where the current may vary with temperature of the object being imaged. The signal detecting unit 150 may convert a comparison result to a digital signal and provide the digital signal to an external signal processing unit such as, for example, an image signal processor (not shown) through a data bus.

The operation of the readout integrated circuit 100 for an infrared signal according to an embodiment of the invention will be described with reference to FIGS. 2 and 3.

The readout integrated circuit 100 for an infrared signal according to an embodiment of the invention may perform a calibration process (i.e., operate in a calibration mode) for obtaining a background current $I_{back}$ of each pixel before performing a normal infrared image capture process.

In the calibration mode, the switches S1 and S2 are turned on and the switches S3 and S4 are turned off, such that the skimming transistor Mp1 performs a diode connected operation. At this time, the background current $I_{back}$ flows in the microbolometer. A voltage applied to the gate of the skimming transistor Mp1 is supplied to the analog-to-digital converter 111 through the switches S1 and S2. The analog-to-digital converter 111 converts the supplied voltage into digital data and stores the digital data in the first memory 113. The number of bits in the digital data may be design dependent depending on the number of global lines 121. The digital data may allow appropriate voltage to be applied to a gate of the skimming transistor Mp1.

Thereafter, in the operation mode, the switches S1 and S2 are turned off and the switches S3 and S4 are turned on. The decoder 115 decodes the digital data stored in the first memory 113 and supplies the decoded output to the switch part 117. A specific switch among the plurality of switches in the switch part 117 is switched on corresponding to the decoded output being supplied thereto, such that a predetermined voltage is applied to the gate of the skimming transistor Mp1 through the corresponding global line connected to the specific switch.

The skimming transistor Mp1 is turned on when the predetermined voltage is applied through the corresponding global line such that the background current $I_{back}$ flows through the skimming transistor Mp1 to the corresponding microbolometer. In operation the microbolometer may conduct both the background current $I_{back}$ and a signal current $I_{sig}$, where the signal current $I_{sig}$ is a current flowing due to a resistivity change of the microbolometer. The resistivity of the microbolometer may vary according to a change in the temperature of the object being imaged. Accordingly, only the signal current $I_{sig}$ may flow through the integration capacitor $C_{INT}$.

The current driven by the microbolometer discharges the integration capacitor $C_{INT}$, and whenever the voltage of the integration capacitor $C_{INT}$ reaches a level equal to a reference voltage, the output of the comparator 151 is switched. Also, a refresh transistor Mp2 may be turned on according to a falling edge of the output of the comparator 151, and the integration capacitor $C_{INT}$ may be rapidly charged. Here, the output of the comparator 151 is provided as an input of the counter 153 in pulse form, and a pulse frequency directly depends on a current value of the microbolometer.

After the output of the counter 153 is stored in the second memory 155, it is provided to the external signal processing unit through the data bus.

In the readout integrated circuit 100 according to an embodiment of the invention, a plurality of global lines 121 are provided outside of the pixel area and a global line providing a voltage having a level closest to that of the gate voltage stored in the calibration mode is connected to the gate of the skimming transistor Mp1 within each pixel. However, since there may be a limitation on the number of available global lines, there may be a difference in voltage values applied to the gate of the skimming transistor between the calibration mode and the operation mode, when compared with a conventional scheme.

In general, a signal detected in a readout integrated circuit for an image sensor is processed by a digital signal processing unit and an image is restored. Since a difference in voltage values is consistent during each frame time, a digital signal processing unit may recognize the difference in voltage values as an offset and perform signal processing taking the offset into consideration, and accordingly, the difference in voltage values may be calibrated.

As described above, the readout integrated circuit 100 for an infrared signal according to an embodiment of the invention controls the operation of the skimming transistor Mp1 by the switching of the global lines 121, such that a current skimming operation can be performed without a skimming capacitor. Accordingly, the readout integrated circuit 100 may operate at low power and reduce a pixel pitch due to a reduction of an area of a pixel that may have been associated with, for example, the skimming capacitor $C_{skim}$ shown in FIG. 1.

Figure 4:
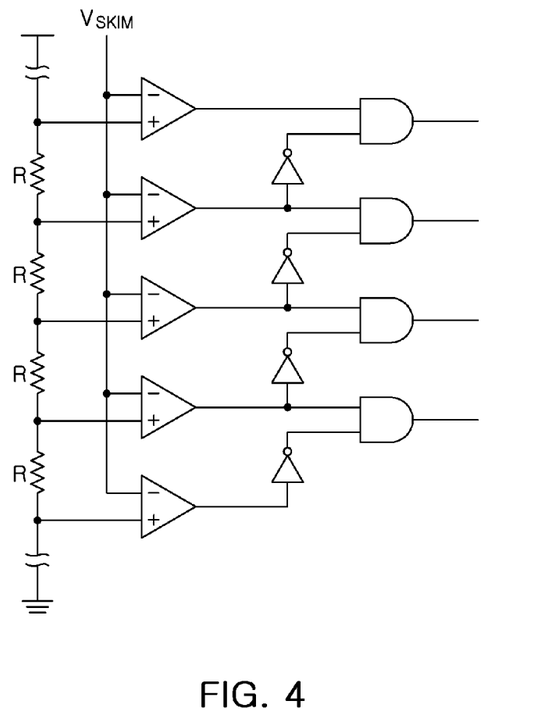
FIG. 4 is a circuit diagram illustrating a detailed configuration of an analog-to-digital converter of FIG. 2.

FIG. 4 is a circuit diagram illustrating a detailed configuration of the analog-to-digital converter of FIG. 2.

In the readout integrated circuit 100 for an infrared signal according to an embodiment of the invention, each pixel comprises the analog-to-digital converter 111. The operational speed of the analog-to-digital converter 111 should be designed such that it is adequate for the readout integrated circuit 100 to operate normally.

Therefore, in order to achieve rapid operation of the readout integrated circuit 100, the analog-to-digital converter 111 may be configured using flash-type analog-to-digital converter as shown in FIG. 4.

Figure 5:
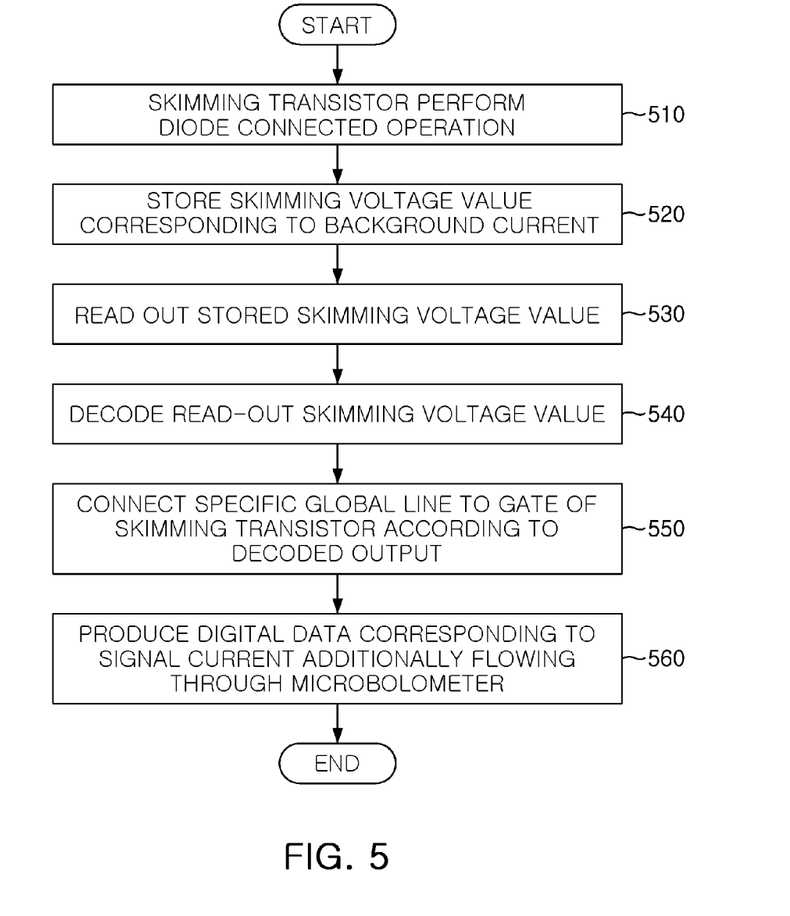
FIG. 5 is a flowchart illustrating a method of detecting an infrared signal according to an embodiment of the present invention.

FIG. 5 is a flowchart illustrating a method of detecting an infrared signal according to an embodiment of the present invention.

With reference to FIG. 5, in the calibration mode, for each pixel, the gate and the source of the skimming transistor $M_{p1}$ are connected to each other such that the skimming transistor $M_{p1}$ performs a diode connected operation in operation 510. A voltage value (i.e., a skimming voltage value) corresponding to the background current $I_{back}$ flowing through the skimming transistor $M_{p1}$ is converted into digital data by the ADC 111, and the digital data is stored in the first memory 113 in operation 520.

Thereafter, in the operation mode, the digital data of the skimming voltage value stored in the calibration mode is read-out from the first memory 113 in operation 530 and the read-out digital data is decoded by the decoder 115 in operation 540.

The output decoded in operation 540 turns on a specific switch among the plurality of switches in the switch part 117 such that a specific global line corresponding to the specific switch being in an on state is connected to the gate of the skimming transistor in operation 550. Accordingly, a predetermined voltage applied to one of the specific global lines 121 is applied to the gate of the skimming transistor $M_{p1}$ such that the skimming transistor $M_{p1}$ is turned on.

As the skimming transistor $M_{p1}$ is turned on, the microbolometer has a background current $I_{back}$ and a signal current $I_{sig}$ corresponding to a change in a temperature of an object to be imaged flowing therethrough. Since the integration capacitor $C_{int}$ has only the signal current flowing through it, a voltage value corresponding to the signal current is compared with a predetermined reference voltage. After a comparison result is counted and stored, digital data corresponding to the detected infrared signal is produced in operation 560. This digital data may be supplied to an external signal processing unit through the data bus.

As set forth above, in a readout integrated circuit for an infrared signal and a method of reading out an infrared signal using the same according to various embodiments of the invention, there are provided a plurality of global lines supplying voltages of different levels for current skimming; a gate voltage value of a skimming transistor is stored in a calibration mode and the stored voltage value is decoded in an operation mode such that a specific switch is turned on to thereby connect the corresponding global line providing a voltage value closest to the gate voltage value to a gate of the skimming transistor, whereby the skimming transistor is turned on.

Accordingly, current skimming may be performed without use of a large skimming capacitor within a pixel, and the readout integrated circuit is able to operate at low power. In addition, since the large skimming capacitor is not used, a pixel pitch may be reduced and price competitiveness may be improved.

While the present invention has been shown and described in connection with the various embodiments, it will be apparent to those skilled in the art that modifications and variations can be made without departing from the spirit and scope of the invention as defined by the appended claims.

What is claimed:

1. A readout integrated circuit for an infrared signal, the readout integrated circuit comprising:
   a skimming transistor configured to allow a background current to flow through a microbolometer according to a gate voltage;
   a plurality of global lines each configured to supply a voltage of a different level;
   a global line selecting unit configured to select a global line to be connected to the skimming transistor; and
   a signal detecting unit configured to output a digital signal corresponding to a signal current flowing through the microbolometer.

2. The readout integrated circuit of claim 1, wherein the global line selecting unit comprises:
   an analog-to-digital converter configured to convert a voltage corresponding to the background current flowing through the skimming transistor in a calibration mode to digital data;
   a first memory configured to store the digital data;
   a decoder configured to decode the digital data stored in the first memory and output a decoded signal in an operation mode; and
   a switch part configured to select a global line from among the plurality of global lines according to the decoded signal to connect the selected global line to a gate of the skimming transistor.

3. The readout integrated circuit of claim 2, wherein the global line selecting unit further comprises a plurality of switches configured to allow the skimming transistor to perform a diode connected operation in the calibration mode and to end the diode connected operation in the operation mode.

4. The readout integrated circuit of claim 1, wherein the signal detecting unit comprises:
   an integration capacitor configured to supply the signal current flowing through the microbolometer;
   a comparator configured to compare a voltage corresponding to the signal current with a reference voltage and output a comparison result;
   a refresh transistor configured to control charging of the integration capacitor to have a voltage corresponding to an output of the comparator;
   a counter configured to count the output of the comparator; and
   a second memory configured to store an output of the counter.

5. A method of detecting an infrared signal, the method comprising:
   storing, during a calibration mode, first digital data corresponding to a voltage corresponding to a background current flowing through a microbolometer;
   selecting, during operation mode, a voltage corresponding to the first digital data; and
   producing, during operation mode, second digital data corresponding to a signal current, wherein the background current and the signal current flow through the microbolometer.

6. The method of claim 5, wherein the operating of the calibration mode comprises:
   performing, by a skimming transistor connected to the microbolometer, a diode connected operation;
   producing the first digital data corresponding to the background current flowing through the microbolometer; and
   storing the first digital data.

7. The method of claim 5, wherein the selecting of the global line comprises:
   reading out the first digital data; and
   decoding the read-out first digital data to select a global line from among a plurality of global lines.

8. The method of claim 5, wherein the producing of the second digital data comprises:
   comparing a voltage corresponding to the signal current with a predetermined reference voltage and outputting a comparison result;
   counting the comparison result; and
   storing the counted data.

9. The method of claim 8, wherein the outputting of the comparison result refreshes the signal current voltage to allow further comparison with the predetermined reference voltage.

10. The method of claim 5, wherein the voltage corresponding to the first digital data is selected from among a plurality of global lines each providing a voltage of a different level.

11. The method of claim 5, wherein the signal current changes as temperature of an object to be imaged changes.

* * * * *